(12) United States Patent
Mouri et al.

(10) Patent No.: US 12,115,906 B2
(45) Date of Patent: Oct. 15, 2024

(54) IMAGE DISPLAY SYSTEM

(71) Applicants: Fumihiko Mouri, Owariasahi (JP); Kentaro Mori, Tokyo (JP)

(72) Inventors: Fumihiko Mouri, Owariasahi (JP); Kentaro Mori, Tokyo (JP)

(73) Assignees: TOYOTA JIDOSHA KABUSHIKI KAISHA, Aichi-ken (JP); STANLEY ELECTRIC CO., LTD., Tokyo (JP)

( * ) Notice: Subject to any disclaimer, the term of this patent is extended or adjusted under 35 U.S.C. 154(b) by 50 days.

(21) Appl. No.: 18/062,582

(22) Filed: Dec. 7, 2022

(65) Prior Publication Data
US 2023/0173976 A1 Jun. 8, 2023

(30) Foreign Application Priority Data
Dec. 8, 2021 (JP) ................. 2021-199592

(51) Int. Cl.
*G09G 3/00* (2006.01)
*B60Q 1/50* (2006.01)

(52) U.S. Cl.
CPC ............ *B60Q 1/547* (2022.05); *G09G 3/001* (2013.01); *G09G 2340/0464* (2013.01); *G09G 2380/10* (2013.01)

(58) Field of Classification Search
CPC ........ B60Q 1/547; B60Q 1/507; B60Q 1/543; B60Q 2400/50; B60Q 1/247; B60Q 1/525; B60Q 1/00; B60Q 1/26; B60Q 1/50; B60Q 1/535; G09G 3/001; G09G 2340/0464; G09G 2380/10; B60W 30/09; B60W 10/20; B60W 30/0956; B60W 30/18163; B60W 50/10; B60W 60/0017; B60W 2552/00; B60W 2552/05; B60W 2554/4029; B60W 2554/4041; B60W 2554/80; G01S 13/931; G01S 2013/9318; G01S 2013/93185; G01S 2013/9319; G06V 20/58; G06V 40/103;
(Continued)

(56) References Cited

U.S. PATENT DOCUMENTS 11,701,994 B2 * 7/2023 Kunii ................... H04N 9/3194
362/538
2017/0101147 A1 * 4/2017 Hasegawa ................ B62J 50/25
(Continued)

FOREIGN PATENT DOCUMENTS

CN 115803797 A * 3/2023
JP 2016193689 A 11/2016
(Continued)

*Primary Examiner* — James J Yang
*Assistant Examiner* — Anthony D Afrifa-Kyei
(74) *Attorney, Agent, or Firm* — HAUPTMAN HAM, LLP

(57) ABSTRACT

An image display system includes a projector that is mounted on a target vehicle and projects an image onto a road surface around the target vehicle, and an image controller that causes the projector to project a support image onto the road surface around the target vehicle when another vehicle traveling behind the target vehicle starts an operation of overtaking the target vehicle, and the support image includes at least one of an image showing a no-entry area which the other vehicle is prohibited from entering and an image showing a passage area through which the other vehicle is to pass during the overtaking operation.

10 Claims, 5 Drawing Sheets

(58) Field of Classification Search
CPC .......... G08G 1/166; G08G 1/16; G08G 1/167; G06F 3/013
See application file for complete search history.

(56) References Cited

U.S. PATENT DOCUMENTS

2017/0301318 A1\* 10/2017 Nishimura ............. B60K 35/00
2022/0219599 A1    7/2022 Mochizuki et al.

FOREIGN PATENT DOCUMENTS

| JP | 2018206308 A | 12/2018 |
| JP | 202055519 A | 4/2020 |

\* cited by examiner

IMAGE DISPLAY SYSTEM

CROSS REFERENCE TO RELATED APPLICATION

This application claims priority to Japanese Patent Application No. 2021-199592 filed on Dec. 8, 2021, which is incorporated herein by reference in its entirety including the specification, claims, drawings, and abstract.

TECHNICAL FIELD

The present application discloses an image display system that projects and displays an image on a road surface around a vehicle.

BACKGROUND

The technique of projecting an image onto a road surface around a vehicle by using a projector mounted on the vehicle has been known in recent years. For example, Patent Document 1 discloses a drawing device for a vehicle that draws a marker on a road surface in a traveling direction of the vehicle when a turn signal lamp of the vehicle is turned on. This technique enables clear transmission of the traveling direction of the vehicle to drivers of other vehicles or pedestrians when the vehicle changes lanes or turns left or right, thereby improving safety.

CITATION LIST

Patent Literature

Patent Document 1: JP 2016-193689 A

SUMMARY

However, according to the technique of Patent Document 1, projection of the image on the road surface is carried out only when the vehicle on which the projector is mounted (hereinafter referred to as "target vehicle") itself performs a certain action (in this case, lighting of the turn signal lamp). Therefore, for the technique of Patent Document 1, when another vehicle traveling behind the target vehicle overtakes the target vehicle, image projection on the road surface is not carried out. In other words, in the conventional technique, image projection on the road surface cannot be used to improve safety when the other vehicle overtakes the target vehicle.

The present specification discloses an image display system capable of further improving safety when the other vehicle traveling behind the target vehicle overtakes the target vehicle.

An image display system disclosed herein is characterized in that it includes a projector that is mounted on a target vehicle and projects an image onto a road surface around the target vehicle, and an image controller that causes the projector to project a support image onto the road surface around the target vehicle when another vehicle traveling behind the target vehicle starts an operation of overtaking the target vehicle, and the support image includes at least one of an image showing a no-entry area which the other vehicle is prohibited from entering and an image showing a passage area through which the other vehicle is to pass during the overtaking operation.

Such a configuration enables a driver of the other vehicle to easily recognize the area which the other vehicle cannot enter or the area which the other vehicle should pass when performing the overtaking operation, thereby improving safety in the overtaking operation.

In this case, the image display system further includes a rear sensor that detects a situation behind the target vehicle, and the image controller may obtain a relative velocity between the other vehicle traveling behind the target vehicle and the target vehicle based on the detection result from the rear sensor and determine if the overtaking operation has started based on at least the relative velocity.

Such a configuration makes it possible to accurately determine if the overtaking operation has started. Many vehicles are usually equipped with a sensor that detects a situation behind them. By using this sensor as the rear sensor described above, it also becomes possible to determine if the overtaking operation has started without addition of a new sensor.

In this case, the image controller may identify at least one of a steering state and a lighting state of a turn signal of the other vehicle traveling behind the target vehicle based on the detection result from the rear sensor and determine if the overtaking operation has started based on the relative velocity and at least one of the steering state and the lighting state.

This makes it possible to more accurately determine if the overtaking operation has started.

The image controller may also end projection of the support image at least based on the detection result from the rear sensor.

This makes it possible to prevent projection of the support image for an unnecessarily long time. Power consumption can thus be suppressed. By ending projection of the support image at an appropriate timing, it is also possible to prevent drivers of other vehicles and pedestrians unrelated to the overtaking operation from seeing the support image and getting confused.

The image controller may also end projection of the support image at least based on the amount of time elapsed since the start of the overtaking operation.

This makes it possible to decide a timing to end projection of the support image in a simple manner. It also makes it possible to prevent projection of the support image for an unnecessarily long time. Power consumption can thus be suppressed. By ending projection of the support image at an appropriate timing, it is also possible to prevent the drivers of the other vehicles and the pedestrians unrelated to the overtaking operation from seeing the support image and getting confused.

The image display system also includes a front sensor that detects a situation in front of the target vehicle, and the image controller may also end projection of the support image at least based on the detection result from the front sensor.

Such a configuration makes it possible to end projection of the support image at a timing when the other vehicle arrives in front of the target vehicle; that is, at a timing when the overtaking operation is completely ended. It also makes it possible to prevent projection of the support image for an unnecessarily long time. Power consumption can thus be suppressed. By ending projection of the support image at an appropriate timing, it is also possible to prevent the drivers of the other vehicles and the pedestrians unrelated to the overtaking operation from seeing the support image and getting confused.

The image controller may also change at least one of the size and projection position of the support image according to the steering of the target vehicle.

This makes it possible to transmit movement of the target vehicle to the driver of the other vehicle, and the other vehicle can thus perform the overtaking operation more safely.

In addition, the image display system further includes an acceleration sensor that detects the acceleration of the target vehicle in the vehicle width direction, and the image controller may change at least one of the size and projection position of the support image according to the detection result from the acceleration sensor.

Such a configuration makes it possible to transmit movement of the target vehicle, particularly, movement not intended by a driver of the target vehicle (for example, movement of the target vehicle caused by strong winds, uneven road surfaces, or the like) to the driver of the other vehicle, and the other vehicle can thus perform the overtaking operation more safely.

The image display system disclosed herein makes it possible to further improve safety when the other vehicle traveling behind the target vehicle overtakes the target vehicle.

BRIEF DESCRIPTION OF DRAWINGS

Embodiments of the present disclosure will be described based on the following figures, wherein.

DESCRIPTION OF EMBODIMENTS

Figure 1:
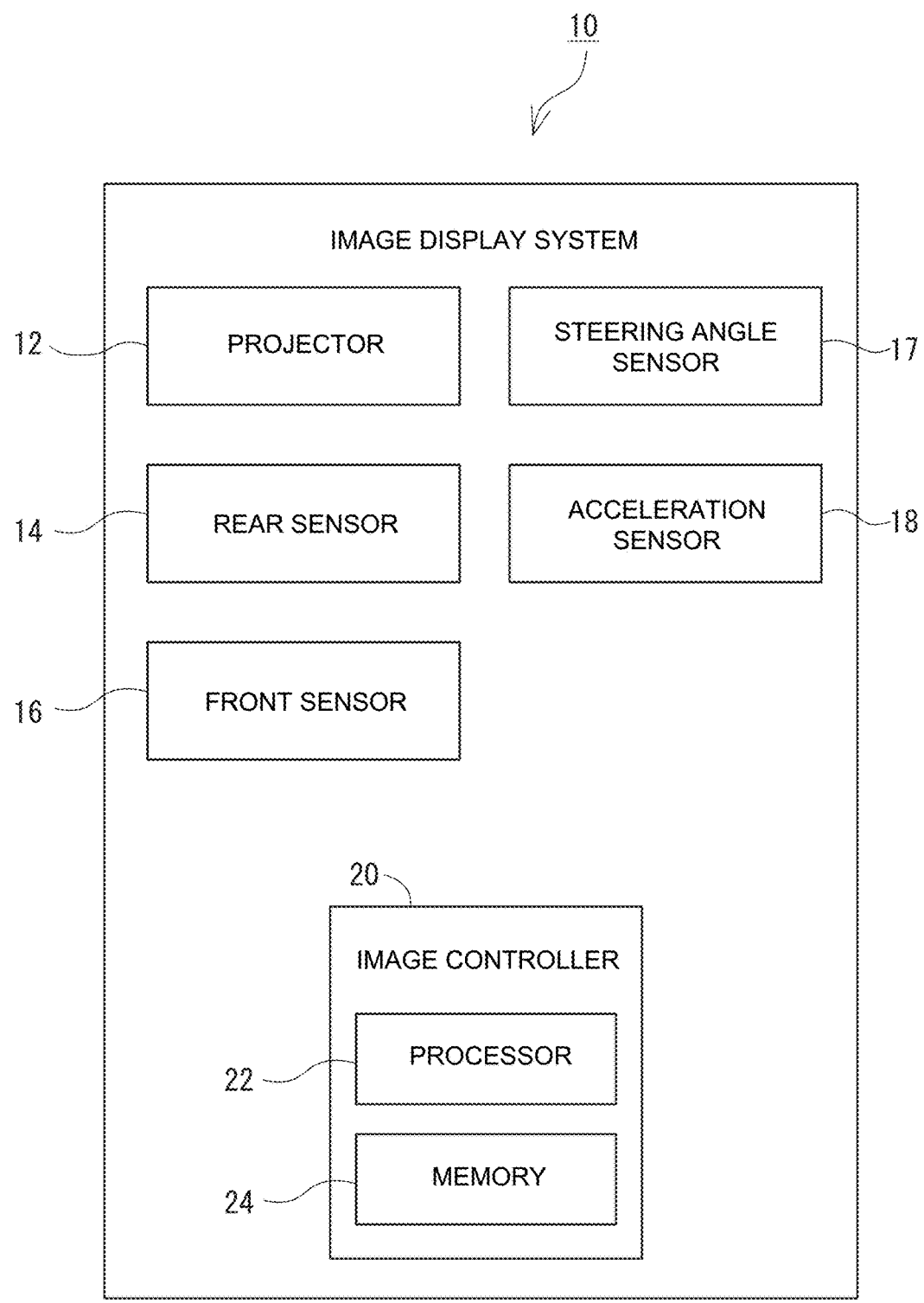
FIG. 1 is a block diagram showing a configuration of an image display system.

Hereinafter, a configuration of an image display system 10 will be described with reference to the drawings. FIG. 1 is a block diagram showing the configuration of the image display system 10. This image display system 10 is mounted on a target vehicle and projects an image onto a road surface around the target vehicle.

As shown in FIG. 1, the image display system 10 has a projector 12, a rear sensor 14, a front sensor 16, a steering angle sensor 17, an acceleration sensor 18, and an image controller 20. The projector 12 projects the image onto the road surface around the target vehicle. No limitation is imposed on the configuration of the projector 12 so long as it can have one or more light sources and irradiate the road surface with light which forms the image. The projector 12 may thus be an LCD type, DLP type, or LCOS type liquid crystal projector that projects the image using light from LED lights or the like. The projector 12 may also be of the type that projects light from a light source, such as a normal headlight, through a lens. In the present example, the projector 12 also functions to change the content, the position, and the size of the image drawn on the road surface.

The rear sensor 14 is a sensor that detects a situation behind the target vehicle. More specifically, the rear sensor 14 detects a situation of a predetermined rear detection area that is set behind the target vehicle. The rear sensor 14 can detect the presence or absence of another vehicle in this rear detection area and the distance to the other vehicle present in the rear detection area. The rear sensor 14 may also be capable of detecting at least one of a position of the other vehicle and a lighting state of a turn signal lamp of the other vehicle. Such a rear sensor 14 may have, for example, a plurality of sensors installed separately at a plurality of locations of the target vehicle. For example, the rear sensor 14 may have at least one of a camera, a millimeter wave radar, a quasi-millimeter wave radar, an ultrasonic sensor, and LiDAR.

The front sensor 16 detects a situation of a predetermined front detection area that is set in front of the target vehicle. The front sensor 16 detects the presence or absence of another vehicle in the front detection area, the distance to the other vehicle, a position of the other vehicle, a lighting state of a turn signal lamp of the other vehicle, and the like. Such a front sensor 16 may have, for example, a plurality of sensors installed separately at a plurality of locations of the target vehicle. For example, the front sensor 16 may have at least one of a camera, a millimeter wave radar, a quasi-millimeter wave radar, an ultrasonic sensor, and LiDAR.

The steering angle sensor 17 detects the steering angle of the target vehicle. The steering angle sensor 17 is attached to, for example, a steering shaft of the target vehicle and detects the rotation direction and the rotation angle of the steering shaft. The steering angle sensor 17 is an optical or magnetic rotary encoder, for example.

The acceleration sensor 18 detects the acceleration in directions of three orthogonal axes of the target vehicle; that is, the vehicle front-rear direction axis, the vehicle vertical direction axis, and the vehicle width direction axis. The detection results are transmitted to the image controller 20. The image controller 20 integrates the detected acceleration, thereby calculating the velocity of the target vehicle. The image controller 20 also performs second-order integration on the acceleration, thereby calculating the displacement of the target vehicle. The vehicle is usually equipped with sensors, such as a camera and a millimeter-wave radar, for driving assistance (for example, an auto-brake function, a lane keeping assist function, and the like) and traveling control. Such existing sensors may be used as the sensors 14, 16, 17, and 18 described above. Further, apart from the existing sensors, a dedicated sensor may also be additionally installed in the vehicle for the image display system 10.

The image controller 20 controls the operation of the projector 12 and causes it to project the image on the road surface. More specifically, the image controller 20 determines whether or not the other vehicle traveling behind the target vehicle has started the overtaking operation, based on the detection result from the rear sensor 14. When the image controller 20 determines that the other vehicle has started the overtaking operation, it instructs the projector 12 to project a support image 62 (described below) onto the road surface. This process will be described below.

The image controller 20 is a computer physically composed of a processor 22 and a memory 24. This "computer" also includes a microcontroller that incorporates computer systems into a single integrated circuit. Further, the processor 22 refers to a processor in a broad sense and includes a general-purpose processor (for example, a Central Processing Unit (CPU) or the like) or a dedicated processor (for example, a Graphics Processing Unit (GPU), Application Specific Integrated Circuit (ASIC), Field Programmable Gate Array (FPGA), Programmable Logic Device, or the like).

The memory 24 is a device that stores digital data to be processed by the computer. This memory 24 includes at least one of a main memory connected to the processor 22 via a memory bus, and a secondary storage device accessed by the processor 22 via an input/output channel. The memory 24 may include at least one of a semiconductor memory (for example, RAM, ROM, solid state drive, or the like) and a magnetic disk (for example, hard disk drive or the like). The memory 24 of this example is pre-installed with a program for detecting the presence or absence of the overtaking operation by the other vehicle based on the detection result from the rear sensor 14 and for causing the projector 12 to project predetermined images on the road surface based on that detection result.

Such an image controller 20 may be a single computer or may be composed of a plurality of computers as separate machines. The image controller 20 may also be provided exclusively for the image display system 10. An existing computer that is mounted in advance on the target vehicle, for example, for driving control of the target vehicle may also be used as the image controller 20. A part of processing in the image controller 20 may be executed by another computer provided outside the target vehicle.

Figure 2:
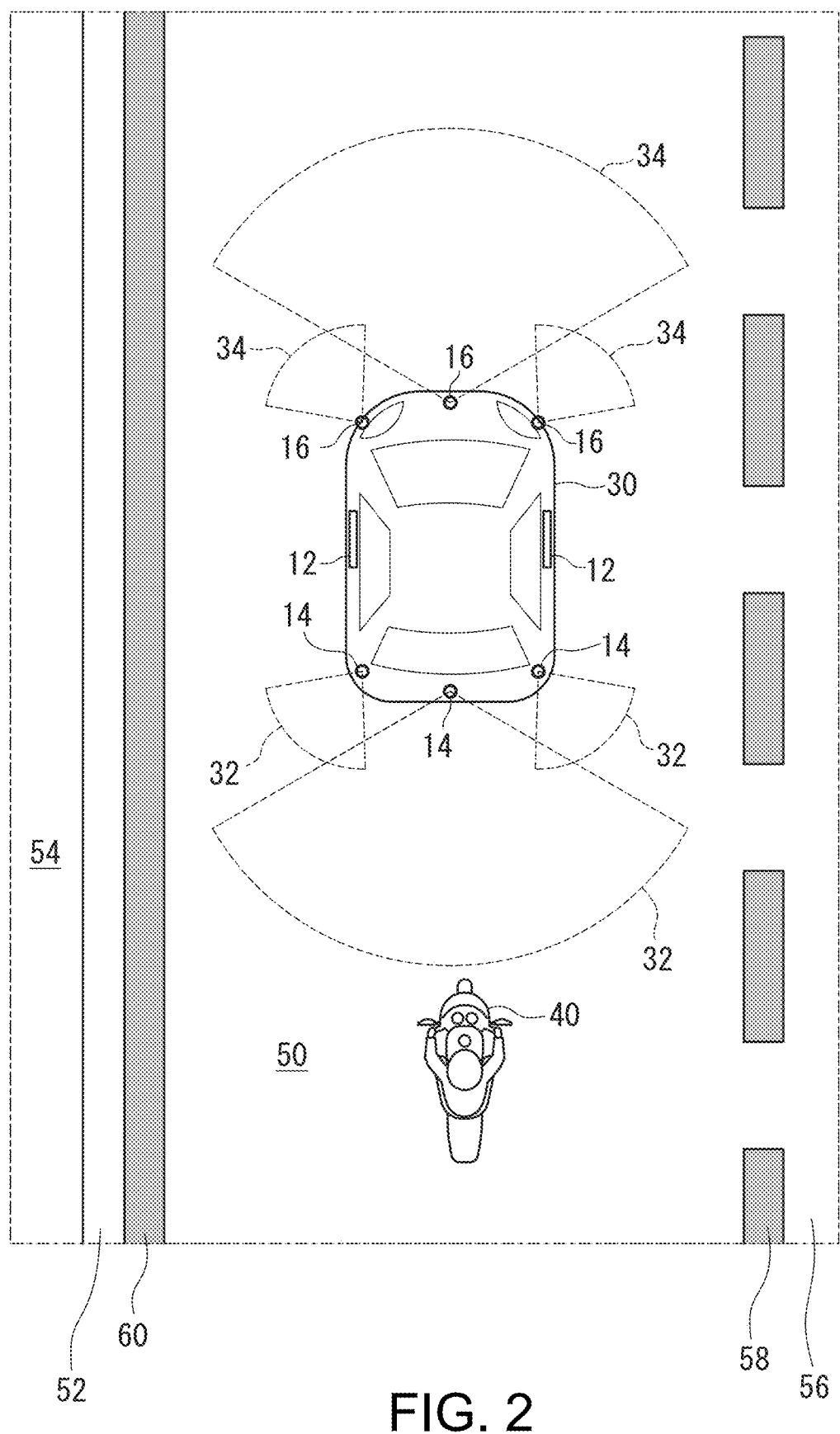
FIG. 2 is a conceptual diagram showing a traveling target vehicle.

Next, image display processing by the image display system 10 will be described. FIG. 2 is a conceptual diagram showing a traveling target vehicle 30. Further, FIG. 3 is a conceptual diagram showing drawn support images 62.

Figure 3:
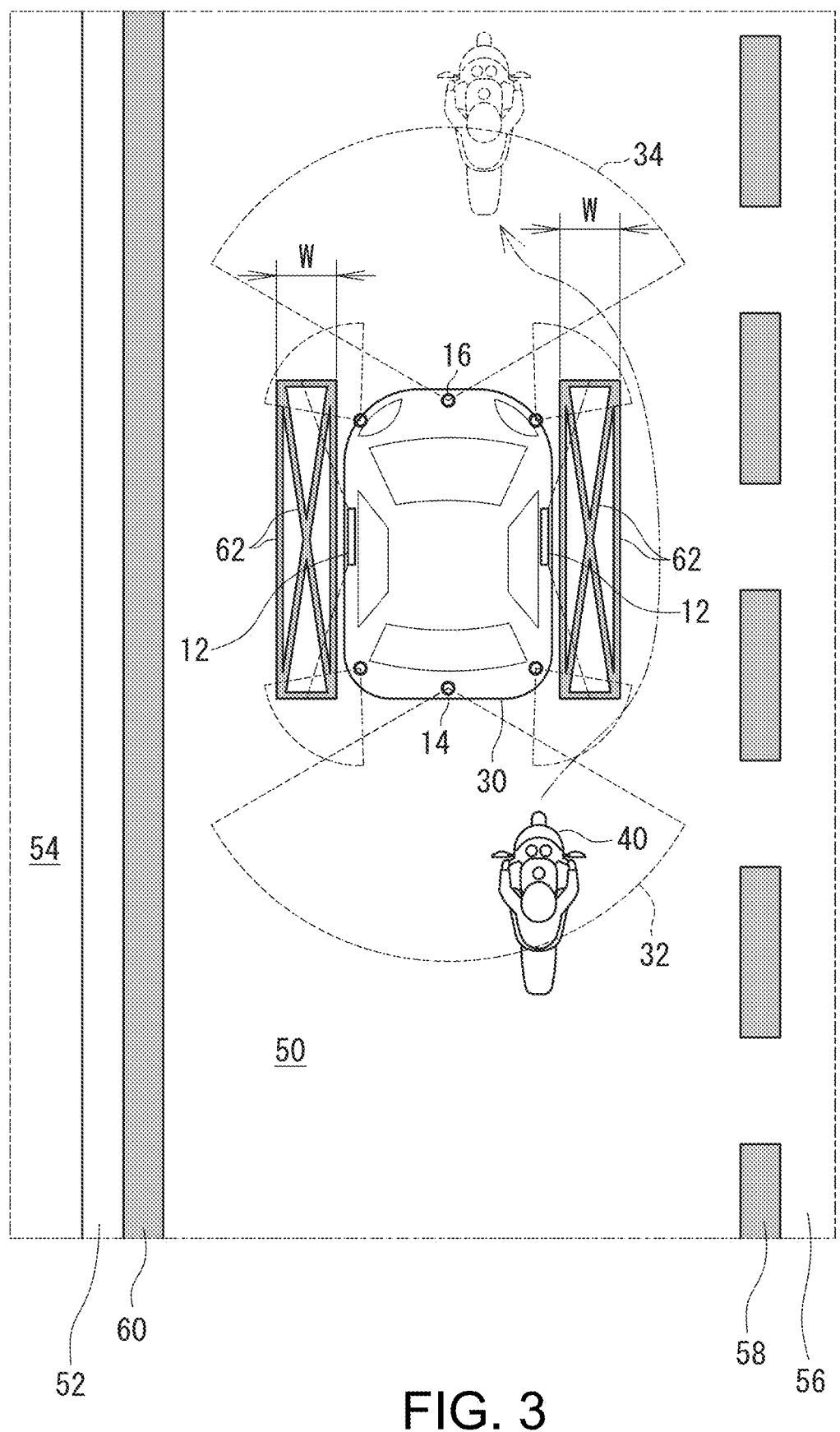
FIG. 3 is a conceptual diagram showing drawn support images.

In FIGS. 2 and 3, the target vehicle 30 is traveling on a road having one lane on one side so as to follow left-hand traffic rules. There are a center line 58 at the right end of a traveling lane 50 on which the target vehicle 30 is traveling and an edge line 60 at the left end of the traveling lane 50. There are also an opposing lane 56 on the right side of the center line 58 and a shoulder 52 between the edge line 60 and a sidewalk 54.

As described above, the target vehicle 30 is provided with the rear sensor 14 and the front sensor 16. In the illustrated example, the rear sensor 14 has three sensors arranged near the rear end of the target vehicle 30, and the detection range covered by these three sensors is a rear detection area 32. Similarly, the front sensor 16 has three sensors arranged near the front end of the target vehicle 30, and the detection range covered by these three sensors is a front detection area 34.

The image controller 20 monitors whether or not another vehicle 40 traveling behind the target vehicle 30 has started the operation of overtaking the target vehicle 30. Here, "overtaking" means the act of changing course and moving ahead of the vehicle in front. This "overtaking" also includes "passing through" where a two-wheeled vehicle passes by the side of a four-wheeled vehicle without changing lanes and moves ahead of the four-wheeled vehicle. On the other hand, "overtaking" does not include "passing by" where, on a road having multiple lanes on one side, a vehicle traveling in one of the lanes (for example, a passing lane) overtakes a vehicle traveling in an adjacent lane without changing lanes.

The image controller 20 may determine if the overtaking operation has started based on, for example, the relative velocity of the other vehicle 40 with respect to the target vehicle 30. For example, the image controller 20 may determine that the overtaking operation has started when the relative velocity is greater than a prescribed reference velocity. In this case, the reference velocity may be a value that is always fixed and unchangeable. The reference velocity may also be a variable value that changes according to, for example, the distance between the target vehicle 30 and the other vehicle 40, the vehicle velocity of the target vehicle 30, the type of the other vehicle 40 (that is, a four-wheeled vehicle or a two-wheeled vehicle), the traffic congestion situation, the speed limit of the traveling lane 50, the behavior of the other vehicle 40 (described below), or the like. For example, when the other vehicle 40 is sufficiently close to the target vehicle 30, and the relative velocity remains high despite the small distance between them, the other vehicle 40 is highly likely to perform the overtaking operation. Therefore, the reference velocity may be reduced as the distance between the vehicles becomes smaller. Further, when it is desired to complete overtaking in N seconds, the relative velocity Vr required for overtaking is theoretically $Vr=\sqrt{(Vt \times A/N)}$, where Vt is the velocity of the target vehicle 30, and A is a coefficient. That is, as the velocity Vt of the target vehicle 30 increases, the relative velocity Vr required to overtake the target vehicle 30 in N seconds also increases. In consideration of this, the reference velocity used to determine if overtaking has started may be increased as the velocity Vt of the target vehicle 30 increases. Further, if the overtaking vehicle (the other vehicle 40 in FIGS. 2 and 3) is a four-wheeled vehicle, it is more likely to get into the adjacent lane as compared to the case where the overtaking vehicle is a two-wheeled vehicle. Generally, it can thus be said that, compared to the two-wheeled vehicle, the four-wheeled vehicle needs to complete the overtaking operation more quickly and requires a higher relative velocity for overtaking. Therefore, if the other vehicle 40 is the four-wheeled vehicle, the reference velocity may be increased as compared to the case where it is the two-wheeled vehicle.

The relative velocity may be identified based on the detection result from the rear sensor 14. For example, when the rear sensor 14 has a millimeter-wave radar or a quasi-millimeter-wave radar for detecting the distance between the vehicles, the image controller 20 may identify the relative velocity from changes in distance detected by the millimeter-wave radar or the like. Further, when the rear sensor 14 has a camera that captures images behind the target vehicle 30, the image controller 20 may analyze the captured images, thereby identifying the distance between the vehicles and thus the relative velocity.

The image controller 20 may also determine if the overtaking operation has started based on the behavior of the other vehicle 40, in addition to the relative velocity. For example, the image controller 20 may determine that the overtaking operation has started when the relative velocity is a velocity that allows overtaking and the other vehicle 40 has moved laterally. Such lateral movement of the other vehicle 40 may be detected, for example, by analyzing changes in position of the other vehicle 40 detected by the millimeter-wave radar or the like, or by analyzing the images captured by the camera. The image controller 20 may also determine that the overtaking operation has started when the relative velocity is a velocity that allows overtaking and the other vehicle 40 has turned on the turn signal lamp. The turning-on of the turn signal lamp may be detected by analyzing the images captured by the camera. As such, by considering the behavior of the other vehicle 40 in addition to the relative velocity, the start of the overtaking operation can be determined more accurately.

In FIG. 3, when the image controller 20 determines that the other vehicle 40 has started the overtaking operation, it instructs the projector 12 to project the support images 62 onto the road surface. The support images 62 are images that support the other vehicle 40 when it performs the operation of overtaking the target vehicle 30. The support images 62 in this example are images showing no-entry areas which the other vehicle 40 is prohibited from entering during the overtaking operation. That is, in order to perform overtaking safely, the other vehicle 40 needs to travel at a certain interval from the target vehicle 30 to avoid interference with the target vehicle 30. In other words, a certain area around the target vehicle 30 needs to be a no-entry area which the other vehicle 40 is prohibited from entering for safe overtaking. The support images 62 show such no-entry areas.

In the example of FIG. 3, the support image 62 has a shape in which a line indicating a boundary of the no-entry area and a cross mark indicating that entry is prohibited are combined. Further, in the example of FIG. 3, the support images 62 are displayed only on the lateral sides of the target vehicle 30. The support image 62 may be projected on only one of the left and right sides of the target vehicle 30, or may be projected on both the left and right sides of it. For example, if the other vehicle 40 is expected to pass by on the right side of the target vehicle 30 for overtaking, the support image 62 may be projected only on the road surface on the right side of the target vehicle 30. In any case, the other vehicle 40 can travel while avoiding the no-entry areas shown by the support images 62, thereby safely performing the overtaking operation without interfering with the target vehicle 30.

After the start of projection of the support images 62, the image controller 20 may end projection of the support images 62 at the timing when the other vehicle 40 can no longer be detected by the rear sensor 14; that is, at the timing when the other vehicle 40 moves to the outside of the rear detection area 32. Further, in another embodiment, after the start of projection of the support images 62, the image controller 20 may end projection of the support images 62 at the timing when the other vehicle 40 can be detected by the front sensor 16; that is, at the timing when the other vehicle 40 moves into the front detection area 34. In yet another embodiment, the image controller 20 may end projection of the support images 62 at the timing when a prescribed amount of overtaking time has elapsed after the start of projection of the support images 62. Here, the amount of overtaking time is a time period during which the other vehicle 40 is considered to be able to complete the operation of overtaking the target vehicle 30. The amount of overtaking time may have a fixed value, or may have a variable value that changes according to the relative velocity or the like. Further, the image controller 20 may adopt combination of the above-mentioned techniques. For example, it may end projection of the support images at the earlier one of the timing at which the amount of overtaking time has elapsed and the timing at which the other vehicle 40 can be detected by the front sensor 16. As a matter of course, the timing of ending projection of the support images 62 may be determined according to conditions other than the above.

Next, the support image 62 will be described in detail. As described above, the support image 62 of this example is an image showing the no-entry area which the other vehicle 40 performing the overtaking operation is prohibited from entering. The form of the support image 62 (that is, the size, projection position, shape, brightness, color, etc.) may be constant at all times, or may be changed according to the behavior of the target vehicle 30.

For example, due to the unevenness of the road surface and the influence of the wind, the target vehicle 30 sometimes move in the vehicle width direction regardless of the steering operation. In addition, a driver of the target vehicle 30 may perform the steering operation for some reason to move the target vehicle 30 in the vehicle width direction. If it is possible to notify the other vehicle 40 of such movement of the target vehicle 30 in the vehicle width direction, the other vehicle 40 can perform the overtaking operation more safely.

For this purpose, the image controller 20 may change at least one of the size and projection position of the support image 62 according to movement of the target vehicle 30. Specifically, the image controller 20 may change the width W of the support image 62 based on the detection results from the steering angle sensor 17 and the acceleration sensor 18.

For example, when the driver of the target vehicle 30 operates the steering wheel to the left or right, the target vehicle 30 moves in the steering direction. In this case, it is necessary to secure a wide no-entry area in that steering direction to perform the overtaking operation safely. When the steering angle sensor 17 detects the steering to either the left or right, the image controller 20 may then increase the width W of the support image 62 in the steering direction according to the amount of steering angle, or shift the projection position of the support image 62 in the steering direction. For example, the image controller 20 may make the width W of the support image 62 on the right side of the target vehicle 30 larger than the width W of the support image 62 on the left side thereof when the steering wheel is turned to the right.

Even when the driver does not operate the steering wheel, the target vehicle 30 sometimes moves in the vehicle width direction due to uneven road surfaces, wind, or the like. Such movement may be detected by the acceleration sensor 18 and reflected in the support image 62. For example, when the acceleration sensor 18 detects the acceleration in the vehicle width direction, the image controller 20 may change at least one of the width W and the projection position of the support image 62 according to the direction and magnitude of the acceleration. For example, when it is possible to determine that the target vehicle 30 is wobbling in the vehicle width direction based on the acceleration detected by the acceleration sensor 18, the image controller 20 may increase the width W of the support image 62 according to the amplitude of wobbling, or may shift the projection position of the support image 62 in a direction away from the target vehicle 30. Further, when it is possible to determine that the target vehicle 30 is moving to the left or right based on the acceleration, the image controller 20 may increase the width W of the support image 62 in the moving direction according to the detected acceleration, or may shift the projection position of the support image 62 in the moving direction according to the detected acceleration.

The image controller 20 may also change at least one of the size and projection position of the support image 62 according to other conditions. For example, the distance to be secured between the target vehicle 30 and the other vehicle 40 during overtaking varies depending on the weather, the vehicle velocity, the road width, and the like. The width W and the projection position of the support image 62 may therefore be changed in consideration of the weather, the vehicle velocity, and the road width. For example, in the case of rain, snow, strong wind, or road surface freezing, the width W of the support image 62 may be increased. Rain and snow may be detected by a raindrop sensor mounted on the vehicle for an auto-wiper function. Road surface freezing may be estimated based on the detection result from a temperature sensor. In addition to or instead of the detection results from these sensors, the image controller 20 may estimate rain, snow, strong wind, road surface freezing, or the like based on weather information acquired by Internet communication or the like.

The image controller 20 may also change at least one of the width W and the projected position of the support image 62 according to the vehicle velocity of the target vehicle 30 or the relative velocity of the other vehicle 40 with respect to the target vehicle 30. For example, the width W of the support image 62 may be increased as the relative velocity increases. At least one of the width W and the projection position of the support image 62 may also be changed according to the road width. For example, when the width of the traveling lane 50 itself is large, or when there is an overtaking lane adjacent to the traveling lane 50, the width W of the support image 62 may be increased. The road width may be identified, for example, from map information recorded in a navigation device, or may be identified by analyzing images captured by the camera.

The size and projection position of the support image 62 may also be set so as not to get into the opposing lane 56 and the sidewalk 54 (including the "margin"). In order to achieve this, the image controller 20 may analyze images captured by the camera mounted on the target vehicle 30 and identify relative positions of the opposing lane 56 and the sidewalk 54 with respect to the target vehicle 30.

The form of the support image 62 itself may also be changed as appropriate. For example, the other vehicle 40 sometimes interferes with the rear and front corners of the target vehicle 30 during overtaking. In order to prevent such interference, the support image 62 may be made longer than the total length of the target vehicle 30, and front and rear ends of the support image 62 may be located outside the front and rear ends of the target vehicle 30 along the front-and-rear direction. That is, the support images 62 may have a shape indicated by reference numeral 62a in FIG. 4.

Figure 5:
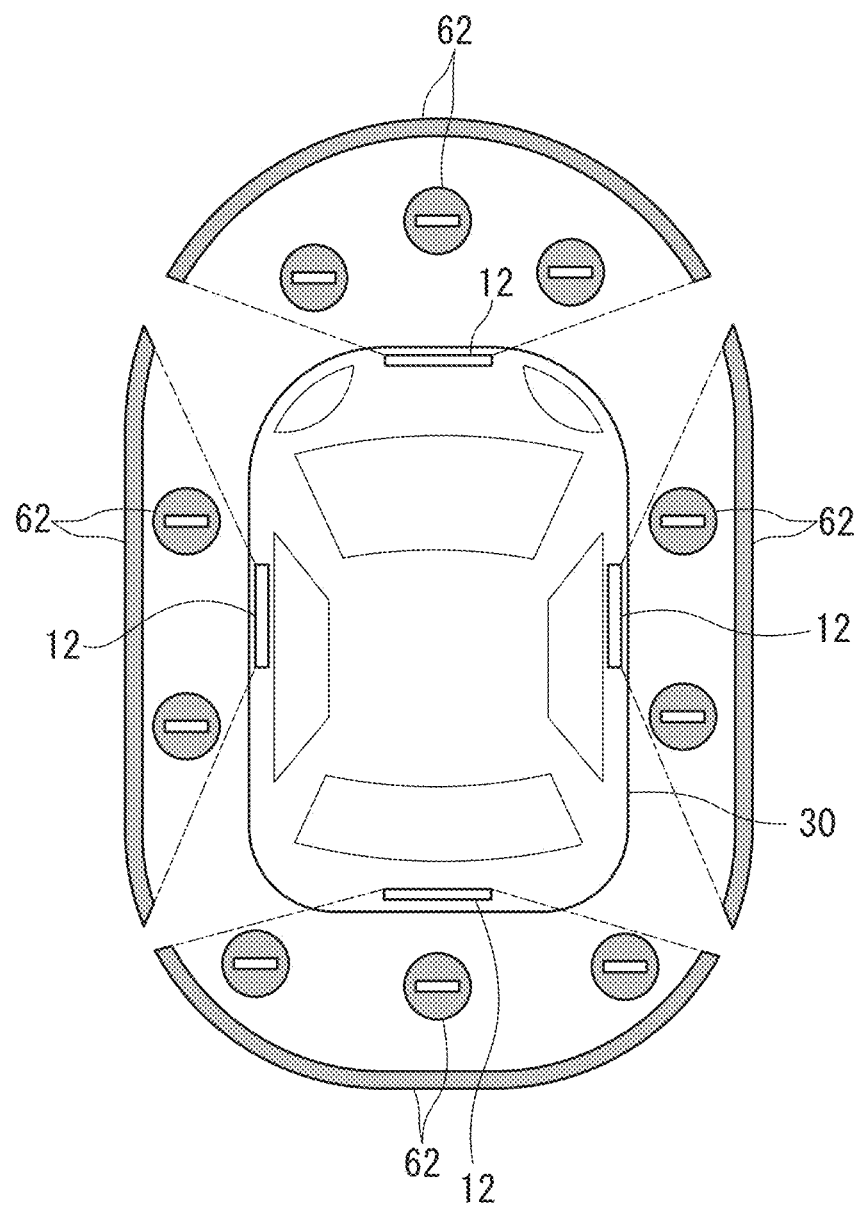
FIG. 5 is a conceptual diagram showing another example of support images.

Further, as shown in FIG. 5, the support images 62 may be projected not only on the lateral sides of the target vehicle 30 but also on the front and rear sides of the target vehicle 30. When the support image 62 is also projected on the front side of the target vehicle 30, the driver of the target vehicle 30 can easily see that support image 62. The driver can then easily visually recognize the support image 62 and notice the existence of the other vehicle 40 trying to overtake the target vehicle 30, and thus safety in the overtaking operation is improved.

Further, although, in the example of FIG. 3, the support image 62 has the shape in which the rectangle and the cross mark are combined, the support image 62 may be changed to other shapes so long as the shapes allow the driver of the other vehicle 40 to understand the meaning indicated by the support image 62. Therefore, as shown by reference numeral 62a in FIG. 4, the support image 62 may have a shape in which lines indicating a boundary of the no-entry area and road signs indicating no entry are combined.

Figure 4:
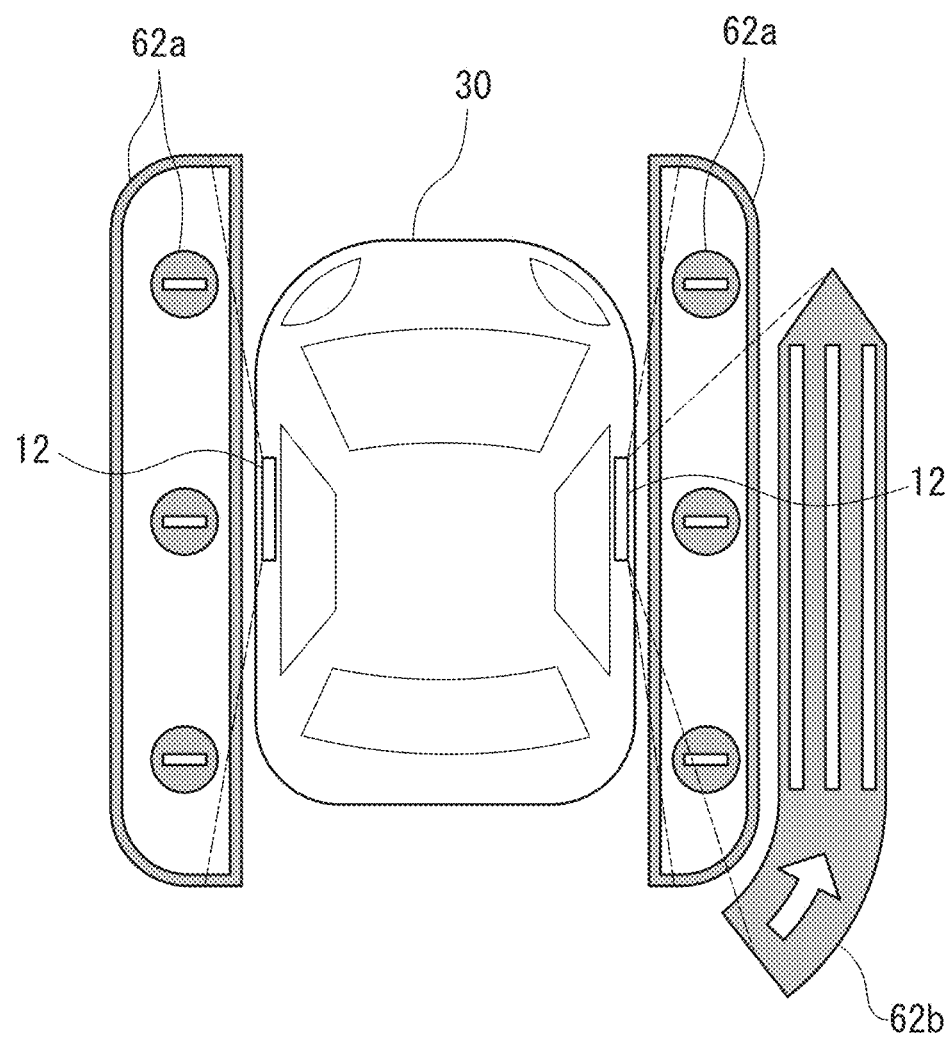
FIG. 4 is a conceptual diagram showing another example of support images.

Further, although, in the above description, the support image 62 is an image showing the no-entry area for the other vehicle 40, the support image 62 may be an image showing a passage area through which the other vehicle 40 is to pass during overtaking. Reference numeral 62b in FIG. 4 is an example of the support image showing the passage area. As is clear from FIG. 4, the support image 62b showing the passage area is projected on the road surface outside the no-entry area. In this case, the support image 62b may also have a shape that encourages the other vehicle 40 to pass through the shape, such as, for example, a shape that includes an arrow indicating the traveling direction. The support image 62b may have a shape including stripes or grids. Such a shape enables the driver of the other vehicle 40 to easily grasp the unevenness of the road surface from distortion of the lines constituting the stripes or the grids. As a result, the driver of the other vehicle 40 can perform the driving operation in consideration of the unevenness and thus perform the overtaking operation more safely. The image controller 20 may project only one of the support image 62a showing the no-entry area and the support image 62b showing the passage area on the road surface, or may project both support images on the road surface at the same time.

The image controller 20 may also change the luminance of the support images 62 according to the brightness around the target vehicle 30. For example, in a bright environment, such as outdoors in daytime, the luminance of the support image 62 may be higher than that in a dark environment, such as at night or in a tunnel. The brightness may be identified based on the detection result from a luminance sensor provided for an auto light function, or may be identified based on the lighting state of lights, such as headlights that are obligated to be turned on at night. Further, the color of the support image 62 may be changed according to the color of the road surface. For example, some roads are painted with red paint which functions to prevent slipping. For such roads, the color of the support image 62 may be changed to a color having less red component compared to the one used for a normal asphalt paved road which is not painted in red. The color of the road surface may be identified by analyzing the images captured by the camera. Further, the support image 62 may be a moving image that changes over time. For example, the support image 62b of FIG. 4 may be a moving image in which at least one of the position, color, and size of the arrow included in the support image 62b changes over time.

As is clear from the above description, the image display system 10 disclosed in the present specification projects the support images 62 showing the no-entry area and/or the passage area on the road surface when the other vehicle 40 starts the overtaking operation. This makes it possible to effectively prevent interference between the target vehicle 30 and the other vehicle 40 and further improve safety in the overtaking operation by the other vehicle 40. The above-mentioned features are all examples. So long as the support image 62 is projected on the road surface when the other vehicle 40 starts the overtaking operation, the other features may be changed as appropriate. For example, no limitations are imposed on the vehicle types of the target vehicle 30 and the other vehicle 40. Each of the target vehicle 30 and the other vehicle 40 may therefore be a two-wheeled vehicle, a four-wheeled vehicle, or yet another type of vehicle. Further, the image display system 10 may also project other types of images on the road surface in addition to the support image 62 described above. For example, when the target vehicle 30 turns left or right, the image display system 10 may project an image showing that traveling direction on the road surface.

REFERENCE SIGNS LIST

10 IMAGE DISPLAY SYSTEM, 12 PROJECTOR, 14 REAR SENSOR, 16 FRONT SENSOR, 17 STEERING ANGLE SENSOR, 18 ACCELERATION SENSOR, 20 IMAGE CONTROLLER, 22 PROCESSOR, 24 MEMORY, 30 TARGET VEHICLE, 32 REAR DETECTION AREA, 34 FRONT DETECTION AREA, 40 ANOTHER VEHICLE, 50 TRAVELING LANE, 52 SHOULDER, 54 SIDEWALK, 56 OPPOSING LANE, 58 CENTER LINE, 60 EDGE LINE, 62 SUPPORT IMAGE.

The invention claimed is:

1. An image display system, comprising:
a projector that is mounted on a target vehicle and is configured to project an image onto a road surface around the target vehicle;
a rear sensor configured to detect a situation behind the target vehicle;

a front sensor configured to detect a situation in front of the target vehicle; and an image controller configured to cause the projector to project a support image onto the road surface around the target vehicle in response to detecting, by the rear sensor, that another vehicle traveling behind the target vehicle starts an operation of overtaking the target vehicle, the support image including at least one of an image showing a no-entry area which the another vehicle is prohibited from entering and an image showing a passage area through which the another vehicle is to pass during the overtaking operation, wherein the image controller is configured to cause the projector to end projection of the support image at a timing when the another vehicle is detected by the front sensor.

2. The image display system according to claim 1, wherein
the image controller is configured to:
obtain a relative velocity between the another vehicle traveling behind the target vehicle and the target vehicle based on a detection result from the rear sensor, and
determine if the overtaking operation has started based on at least the relative velocity.

3. The image display system according to claim 2, wherein the image controller is configured to:
identify at least one of a steering state or a lighting state of a turn signal of the another vehicle traveling behind the target vehicle based on the detection result from the rear sensor, and
determine if the overtaking operation has started based on the relative velocity and the at least one of the steering state or the lighting state.

4. The image display system according to claim 2, wherein the image controller is configured to cause the projector to end projection of the support image at least further based on the detection result from the rear sensor.

5. The image display system according to claim 1, wherein the image controller is configured to cause the projector to end projection of the support image further based on an amount of time elapsed since the start of the overtaking operation.

6. The image display system according to claim 1, wherein the image controller is configured to change at least one of a size of the support image or a projection position of the support image according to steering of the target vehicle.

7. The image display system according to claim 1, further comprising an acceleration sensor configured to detect acceleration of the target vehicle in a vehicle width direction, wherein
the image controller is configured to:
specify an amplitude of wobbling of the target vehicle in the vehicle width direction according to a detection result from the acceleration sensor, and
increase a width of the support image or shift a projection position of the support image in a direction further away from the target vehicle as the amplitude of wobbling increases.

8. The image display system according to claim 1, wherein
the image controller is configured to,
in response to the another vehicle being expected to pass by on a right side of the target vehicle for overtaking, project the support image on the road surface on the right side of the target vehicle while not projecting the support image on the road surface on a left side of the target vehicle, and
in response to the another vehicle being expected to pass by on the left side of the target vehicle for overtaking, project the support image on the road surface on the left side of the target vehicle while not projecting the support image on the road surface on the right side of the target vehicle.

9. The image display system according to claim 1, wherein
the image controller is configured to increase a width of the support image under a specific condition including at least one of rain, snow, strong wind, or road surface freezing, when compared to the width of the support image not under the specific condition.

10. The image display system according to claim 1, wherein
the image controller is configured to project the support image on the road surface ahead of the target vehicle in response to detecting, by the rear sensor, that the another vehicle traveling behind the target vehicle starts the operation of overtaking the target vehicle.

* * * * *